United States Patent
Castle et al.

(10) Patent No.: US 12,425,231 B2
(45) Date of Patent: Sep. 23, 2025

(54) LOGIC CIRCUITRY

(71) Applicant: Hewlett-Packard Development Company, L.P., Spring, TX (US)

(72) Inventors: Steven T. Castle, Corvallis, OR (US); David B. Novak, Corvallis, OR (US); Choon Leng Tan, Singapore (SG); Elijah Houle, Vancouver, WA (US); Paul Jeran, Boise, ID (US); Stephen Panshin, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 278 days.

(21) Appl. No.: 18/548,727

(22) PCT Filed: Mar. 1, 2021

(86) PCT No.: PCT/US2021/020262
§ 371 (c)(1),
(2) Date: Sep. 1, 2023

(87) PCT Pub. No.: WO2022/186812
PCT Pub. Date: Sep. 9, 2022

(65) Prior Publication Data
US 2024/0146540 A1    May 2, 2024

(51) Int. Cl.
*H04L 9/40*     (2022.01)
*H04L 9/32*     (2006.01)

(52) U.S. Cl.
CPC ................... *H04L 9/3247* (2013.01)

(58) Field of Classification Search
CPC .................................................. H04L 9/3247
See application file for complete search history.

(56) References Cited

U.S. PATENT DOCUMENTS

| | | | | |
|---|---|---|---|---|
| 6,816,968 | B1* | 11/2004 | Walmsley | G06F 21/77 |
| | | | | 713/168 |
| 8,588,660 | B2* | 11/2013 | Atzmon | G03G 15/0877 |
| | | | | 399/259 |
| 10,877,422 | B2* | 12/2020 | Osadchyy | G03G 15/556 |
| 2003/0025741 | A1* | 2/2003 | Maeda | B41J 2/17566 |
| | | | | 347/7 |
| 2006/0187251 | A1 | 8/2006 | Pulver et al. | |
| 2007/0092273 | A1* | 4/2007 | Shiroki | G03G 15/553 |
| | | | | 399/27 |
| 2010/0053237 | A1* | 3/2010 | Otsuka | B41J 2/17566 |
| | | | | 347/6 |
| 2011/0307645 | A1* | 12/2011 | Hall | G06F 3/064 |
| | | | | 712/E9.023 |

(Continued)

*Primary Examiner* — Ghodrat Jamshidi
(74) *Attorney, Agent, or Firm* — Foley & Lardner LLP (57) ABSTRACT

A logic circuit, or method using the same, may include a memory storing (i) a plurality of partition groups, each partition group including a plurality of partitions, and (ii) a partition map defining an address and access mode for each of said partitions, defining different access modes for at least some of the partitions. The plurality of partition groups may comprise (i) a general use partition group including a first consumable level counter; (ii) a second use partition group including a second incrementally updatable consumable level counter; and (iii) a guide partition group including a use indicator to indicate which of the first and second consumable level counters to use.

26 Claims, 6 Drawing Sheets

(56) References Cited

U.S. PATENT DOCUMENTS

2018/0281389 A1\* 10/2018 Arakane .............. B41J 2/04541
2020/0001636 A1\* 1/2020 Rosenau .......... G07B 17/00362
2021/0157736 A1\* 5/2021 Bavishi ............... G06F 12/0895

\* cited by examiner

| DATA PARTITIONS | | | PARTITION MAP 119 | |
|---|---|---|---|---|
| PARTITION GROUP | PARTITION | FEATURE | ADD | ACC MOD |
| GENERAL (1st) USE 121 | A | MANUFACTURING DATA | A1 | RO |
| | B | CONS LEVEL COUNTER | A2 | RW_MAX |
| | C1 | FLAGS | A3 | RW_OR |
| | C2 | DIGITAL SIGNATURE | A4 | RO |
| | C3 | TRACKING DATA | A5 | RW |
| GUIDE 123 | D | USE INDICATOR | A6 | RW_MAX |
| | E | DIGITAL SIGNATURE | A7 | RW |
| 2ND USE 125 | F | CONS LEVEL COUNTER | A8 | RW_MAX |
| | G | REMANUFACTURING DATA | A9 | RO |
| | H | FLAGS | A10 | RW_OR |
| 3RD USE 127 | I | CONS LEVEL COUNTER | A11 | RW_MAX |
| | J | REMANUFACTURING DATA | A12 | RW2RO |
| | K | FLAGS | A13 | RW_OR |

LOGIC CIRCUITRY

CROSS-REFERENCE TO RELATED APPLICATIONS

This application is a U.S. National Stage Patent Application under 35 U.S.C. § 371 of PCT/US2021/020262, filed Mar. 1, 2021, which is hereby incorporated by reference in its entirety.

BACKGROUND

Certain components that are replaceable with respect to a receiving host apparatus are provided with logic circuits. These logic circuits communicate with, and are exchangeable with respect to, host controllers. The logic circuits may include at least one security feature such as cryptographic authentication and a digital signature to authenticate data of the logic circuit.

Logic circuits provided with consumable supply components may store information pertaining to the consumable material, such as a consumable level. The consumable level information may be updated by the host or directly or indirectly by the logic circuit itself while the consumable material is consumed.

BRIEF DESCRIPTION OF DRAWINGS

Non-limiting examples will now be described with reference to the accompanying drawings, in which.

DETAILED DESCRIPTION

Some examples of applications described herein are in the context of 2D or 3D print apparatus. However, not all the examples are limited to such applications, and at least some of the principles set out herein may be used in other contexts. Another context may be a field of professional or home diagnostics, pharmaceutics, forensic or laboratory equipment, etc. The consumable, replaceable and/or exchangeable components of this disclosure may be provided with a reservoir to be (re)filled, or already (re)filled, with a consumable. Characteristics of the consumable in the reservoir may be stored on a logic circuit that communicates with a host device such as a print apparatus. Traditionally such logic circuit was developed and authorized by an original equipment manufacturer and designed to be used only once.

Logic circuits for replaceable components that communicate with host apparatus may facilitate various functions including authentication, communicating a state of the component, contents of the component, material type information, color conversion maps, consumable level data, a product identifier, etc. Logic circuits of the host apparatus may receive information from the component logic circuits via a communications interface, and/or may send commands to the replaceable component logic circuits, which may comprise commands to write data to a memory associated therewith, or to read data therefrom. Host apparatus may physically or wirelessly connect to certain example components of this disclosure, such as by physical I2C connection or by network connection. Certain host apparatus logic circuits may be provided on distant servers such as secure servers.

In the field of printing it is known to refill or remanufacture print consumable supply components. Refilling involves refilling a reservoir of a previously used print supply component. For example, an existing fluid port of the reservoir can be used to refill a reservoir after a first exhaustion, or sometimes a hole needs to be drilled. A logic circuit attached to the component may remain unaltered and in position. On the other hand, remanufacturing typically involves replacing or adding a feature of the supply in addition to only refilling, such as adapting a logic circuit or replacing a logic circuit or changing (parts of) the housing or altering other circuitry. In one example, this disclosure involves a logic circuit to facilitate remanufacture. This disclosure involves adapting a logic circuit to support multiple lifetimes of the component. In one example of this disclosure, it is not necessary to remove a logic circuit from a consumable supply component to facilitate updating of the logic circuit and/or refilling of the component, because the logic circuit may be re-configurable in the original attached position. In this disclosure, when referring to remanufacturing this may include writing/updating the logic circuit for re-use after a first (e.g., completed or nearly completed) life cycle.

While certain third party solutions have relied on resetting logic circuits, including resetting a product ID, for other parties this led to certain security or authentication challenges. This disclosure focusses on a new logic data architecture for logic circuits to enable the re-use of a logic circuit associated with refilled consumable supply components.

Example logic circuits described in this disclosure may be adapted to support at least one further life cycle of an associated consumable supply component. The logic circuit may facilitate refill of the component after consumption of the consumable supply material while retaining certain logic circuit capabilities such as consumable level data and/or a product ID. The logic circuit may be adapted to facilitate such second and/or further use, already before the first use, i.e., at an original manufacturing stage. In one example, logic circuits are provided that may be attached or attachable to replaceable components and which logic circuits can be re-written by local remanufacturing tools, to update the logic circuit in accordance with a local refill.

The contents of other applications and patents cited in this disclosure are incorporated by reference.

Figure 1:
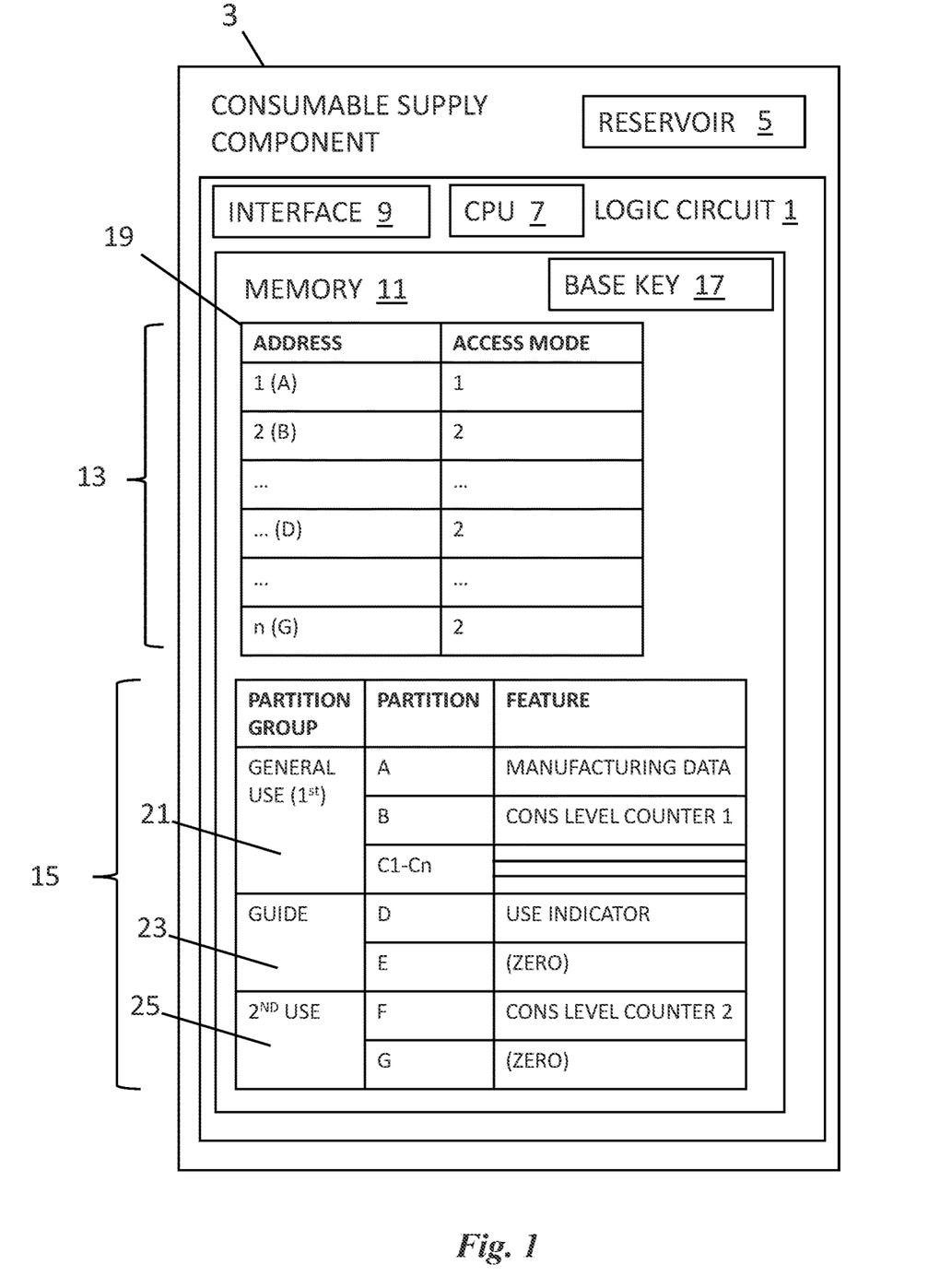
FIG. 1 illustrates a diagram of an example of a logic circuit.

FIG. 1 illustrates a diagram of a logic circuit 1 attached to a consumable supply component 3. It shows a single logic circuit 1 attached to a single component 3. The component 3 with logic circuit 1 is exchangeable with respect to a host. In one example the component 3 may be a print consumable cartridge such as an ink, 3D print agent or toner cartridge, whereby the host may be a printer. In other examples, the component 3 and host may be adapted for one or more other applications that are not printing, some examples of which are already mentioned above. The consumable supply component 3 may be provided with a reservoir 5 to hold a consumable material, and with an output (not shown) for dispensing the consumable. The consumable material may be a printing material such as ink as mentioned in the first example but the consumable material may also be another type of fluid and/or comprise at least one solid.

The logic circuit 1 may comprise a secure microcontroller or a memory circuit. The logic circuit 1 may be provided with an interface 9 to communicate data. The interface 9 may be wired or wireless. The interface 9 may be adapted for communicating over an I2C serial bus interface, including at least one data contact. Other contacts could include a power, ground and clock contact. The logic circuit 1 may communicate with a host controller through the interface 9. In one example, the logic circuit 1 is for a print consumable supply component and configured to communicate with a host printer controller.

The logic circuit 1 is provided with a central processing unit (CPU) 7 to execute instructions including authentication instructions for incoming and/or outgoing data transmissions. The logic circuit 1 may be configured to lock certain bits, fields or partitions to read-only, in response to host commands.

The logic circuit 1 includes a memory 11. In this example the memory 11 stores metadata 13 including a partition map 19; payload data 15 including a plurality of partitions; and a base key 17 for authenticating communications. The memory 11 may store firmware instructions to be executed by the CPU 7, including instructions to cryptographically authenticate data for transmission using the base key 17 as described in U.S. Pat. No. 9,619,663B2. In one example, the base key may be derived from a master key on a host device such as a server or print system, and/or be derived from the master key at manufacturing. In this disclosure the base key may also be understood to comprise a master key from which a base key is derived if such master key is stored on the logic circuit. In certain examples, different memory hardware may be applied for each of these stored features 13, 15, 17, although that may not be necessary depending on the implementation. The base key 17 may be stored so as to be difficult to access by third parties. The base key 17 may be referred to as secret or hidden key, and authentication may include generating session keys and communicating session key identifiers and message authentication codes, whereby the session key identifiers and message authentication codes may be transmitted at each session.

As will be explained later, the logic circuit 1 may comprise instructions, for execution by the CPU 7. Certain instructions are configured to make the CPU 7 lock certain memory bits, fields and/or partitions to read-only. Such locking may be in response to a lock command, or in response to a write command if such write action is for a memory partition that has a read/write to read-only (RW2RO) access mode. Also for such access modes a separate dedicated lock command may be necessary for the CPU 7 to lock the respective bit(s) or partition to read-only. In certain examples, instead of a read/write to read-only access mode, a write-once access mode may be used whereby the CPU 7 may lock the respective field or partition and a locking command may not be necessary.

In one example, the plurality of partitions as a whole may be subdividable into a plurality of partition groups 21, 23, 25, each partition group including a plurality of partitions A, B, C1-Cn, D, E, F, G. Each of these partitions has a predetermined access mode. The plurality of partitions may be associated with a plurality of access modes, whereby some partitions have the same access mode as other partitions. In one example, each partition group includes a plurality of distinct partitions of distinct access modes. The access modes may be indicated by the partition map 19. In this disclosure, access modes may include permission levels such as read/write (RW), read/write to read only at partition level (RW2RO), increment only at bit level (RW_OR), increment only at partition or field (i.e., multiple bits) level (RW_MAX), and/or other access modes such as read only, or, write only. In one example, the payload data 15 and partition map 19 may be associated with at least three or at least four access modes.

The metadata 13 includes a partition map 19. The partition map 19 defines an address and access mode for each of said partitions A-G. In one example, the partition map 19 also defines an encryption mode for each partition. In one example, a partition map address includes a start address and at least one of a corresponding end address and/or a corresponding partition length. Hence, the data length (i.e., size) of each partition is defined by, or can be derived from, the partition addresses. In FIG. 1, the partition map 19 is illustrated by a table, in which the left column contains the addresses of the partitions and the right column contains example access modes. In an implementation of the memory 11, the partition map 19 may be defined by a bitstream of metadata 13, for example, for read-only. In the address column, the related partition of the plurality of partitions is indicated between parentheses. The addresses guide a reading host controller to the relevant partition and at the same time define the access mode for accessing that partition. An example of a partition map is discussed in U.S. Pat. No. 8,205,976B2.

The plurality of partition groups comprises a general use partition group 21. The general use partition group 21 includes a plurality of partitions A, B, C1-n of different functions, whereby for certain partitions A, B, C1-n each field or value may be associated with a different function. The general use partition group 21 includes a first consumable level counter incrementally updatable to indicate a consumable level, defined by an incrementally updatable partition B. The general use partition group 21 may further include manufacturing data in partition A including a fill level and at least one consumable scale factors to calculate the consumable level based on the first consumable level counter B. The fill level may include a fill proportion parameter. The consumable level scale factor may include a weight and/or other scale factor. A fill level and scale factor are described in U.S. Pat. No. 6,089,687.

In other examples, the consumable level counter of partition B may be configured to decrement only. The consumable level counter may be monotonically updatable, that is, to decrement only or to increment only. It will be clear that, while this disclosure may describes incrementally updatable consumable level counters in accordance with one example, other examples may be configured to decrement, and accordingly "increment(ably)" may be replaced by "decrement (ably)" or "monotonic(ally) update(able)".

The general use partition group 21 may be adapted for reading/writing by a host during at least a first use of the consumable supply component, after a first manufacturing of the component 3 and logic circuit 1. Certain data of the general use partition group 21 may also be consulted by the host during subsequent uses, such as a product ID. A first use may constitute a first life cycle of the component 3. In a filled pre-use condition, the consumable level counter may indicate a full condition of the reservoir 5, or at least a state where no consumption has taken place. The consumable level counter may be defined by a corresponding partition B which may be of an increment only access mode, in other words, an access mode that only permits incrementing, whereby the counter partition B may be set to zeros before a first install and use of the component 3. The first consumable level counter may be updated by a connected host controller in an incremental fashion. Locking the partition B to increment only may prevent tampering by unauthorized parties. In the example of printing, a print host controller may update the counter based on printed drops and/or printed pages. In other examples a physical consumable level sensor may be used to update the counter.

In other examples, the partition B may comprise more than one counter whereby each counter field is set to increment only, or whereby the partition is set to increment only and the first counter increments, for example up to a value representing 100%, and then the second counter starts incrementing, whereby for example the second counter may represent a non-authorized or unexpected consumable use. In other examples a counter partition B could be set to a non-zero value before first install, and be configured to decrement towards zero whereby the access mode is set to decrement only. In different examples, the first and second (and/or further) consumable counters may be monotonically updatable and be of a monotonic access mode, that is, to increment only or decrement only.

The plurality of partition groups of the logic circuit 1 may include a second use partition group 25 including a second incrementally updatable consumable level counter, partition F, different than the first incrementally updatable consumable level counter, in partition B. The second consumable level counter may have the same properties as the first updatable consumable level counter. Where the first consumable level counter is monotonically updatable, the second consumable level counter may be similarly monotonically updatable, for example to decrement only. Throughout this disclosure, an incrementally updatable consumable level counter is discussed but it could be replaced by other monotonically updatable consumable level counters such as decrementably updatable (i.e., updatable to decrement only) consumable level counters.

The second consumable level counter may be defined by a different partition F than the first consumable level counter of partition B. In an example of an incrementally updatable consumable level counter, the logic circuit is configured to keep the second consumable level counter at zero until the second use of the consumable supply component 3 initiates, after to a refill. The first and second consumable level counters may be defined by different partitions comprising the same increment-only access modes. In an example of a decrement-only partition for a consumable level counter, the first and/or second consumable level counter may ship with a non-zero value to decrement towards zero, for example, a consumable level counter of a decrement-only partition be comprised of bits set to ones (1s), for example a field of all one values.

As will be explained further below, the second use partition group 25 may be associated with at least one second life cycle of the component 3. The second use partition group 25 may be associated with one remanufacturing event or with more than one remanufacturing events. Further use partitions groups may be added for further (third, fourth, etc.) remanufacturing events or the same second use partition group may be reused for further (third, fourth, etc.) uses, or both.

Remanufacturing data including a second new fill level and/or a second new consumable scale factor may be written to a different partition G of the second use partition group 25 after the first use and before second use, in a similar fashion as the manufacturing data of partition A before the first use. The second fill level may be the same as or different than the first fill level and the second scale factor may be the same as or different than the first scale factor, for example, depending on the added consumable quantity of the refill event. The remanufacturing data in partition G may facilitate calculating a consumable level based on the second consumable level counter, whereby the second fill level may be adapted to the level of refilled consumable in the reservoir 5. Before the remanufacturing event, the partition G may be comprised of zeros.

The partition map 19 may define the addresses and access modes of each of the partitions F, G of the second use partition group 25, already at original manufacturing, before first use. The consumable level counter partition may be of an increment only (e.g. RW_MAX) access mode and the remanufacturing partition G may be of a Read/Write to read only (e.g., RW2RO) access mode, which are correspondingly defined by the partition map 19. Before the first remanufacturing write event the guide partition group 23 and the second use partition group 25 may be comprised of zeros while the partition map 19 may already define the addresses, lengths, encryption modes and access modes of each partition D-G of those groups 23, 25 before they are (over)written at first remanufacture. Several partitions of the same function, such as the counter partitions B and F may be of the same length and access modes as defined in the partition map 19.

The manufacturing data of partition A of the general use partition group 21 may be set to read-only at a manufacturing and write event before first use. The remanufacturing data of partition G may be set to read-only at a remanufacturing and write event after the first use and before the second use. After original manufacturing and/or at a first sale of the filled consumable supply component, the manufacturing data partition A may be read-only whereas the remanufacturing data G partition may be read/write to read-only or write once.

In a further example, the memory 11 includes a guide partition group 23 including a use indicator to indicate to the host which of the first and second consumable level counters to use. In this example, the use indicator is set in partition D. The use indicator may reflect if the logic circuit 1 is to be associated with a first use, or a second use after refill. The partition map 19 may define the addresses and access modes of each of the partitions D, E of the guide partition group 25, already at original manufacturing, before first use. For example, the use indicator D may be set to zero at or before a first use, whereby the zero value may point a host to the first consumable level counter in the general use partition group 21. The access mode of the partition of the use indicator D may be increment-only (RW_MAX). At a first remanufacturing event, the use indicator value may be updated to guide a host to the second consumable level counter of partition F. The use indicator may be set to zero at original manufacture and incremented at each remanufacturing event.

In other examples, the use indicator may be of any monotonic access mode, such as to decrement only instead of increment only, whereby the initial value may be non-zero such as a series of bits set to one (1).

In further examples, additional partition groups for a third, fourth and/or further use could be added, having similar properties as the second use partition group, whereby at each new remanufacturing event the use indicator may be updated to point to the corresponding new use partition group, so that the host may each time update a new corresponding consumable level counter during use. The logic circuit 1 may include at least a third use partition group that is a repetition of the second use partition group, the use indicator of partition D to indicate to a connected host which of the general use 21, second use 25 and third use partition group to use.

These and other examples of logic circuit architectures of this disclosure may facilitate updating the logic circuits 1 at each refill. Third party refillers may be supplied with compatible tools to update the second (and/or further) use partition groups, whereby certain security aspects and the consumable level indication of the original logic circuits 1 are kept. Security compromises associated with resetting and/or re-writing logic circuits can be prevented. In one example, logic circuits of this disclosure permit use of the same product ID (identifier and/or serial number) over the multiple uses. In some examples the logic circuit may remain physically connected to the component when being updated during the one or more remanufacturing events.

The general use partition group 21 may include a partition with a brand or trademark field. This field may be read-only after being written to at manufacture (e.g., write once or read/write to read-only). The second and/or further use partition group may include a similar brand or trademark field, which field may be write once or read/write to read-only. The contents of the second trademark field may be different than the contents of the first trademark field. The second trademark field may relate to, and/or be written to by, a remanufacturer. The first trademark field may relate to an original manufacturer of the component 3 and/or logic circuit 1.

In one example, the general use partition group 21 includes at least one partition C1-Cn that is read only that includes a first digital signature. The first digital signature may include signed manufacturing data as set by an original manufacturer. The guide partition group 23 may include at least one separate partition E, to store a second read-only digital signature upon writing to the second use partition group for remanufacturing. The second signature partition E may be to receive a digital signature that is signed over the first digital signature and some other data of the second use partition group 25, for example including at least a part of the remanufacturing data of the second use partition 25. After first manufacture and before first use this second signature partition E of the guide partition group 23 may comprise a field of zeros.

The second digital signature partition E may be of a read/write access mode so that a digital signature may be, for a first remanufacturing event, written, and for subsequent manufacturing events, overwritten, to the second digital signature partition E. The read/write access mode may permit at least one overwrite of a second digital signature, in accordance with more than one remanufacturing event. The partition map 19 indicates said access mode of read-write in association with the address of the partition E. The CPU 7 is configured to cryptographically authenticate all read/write events. A remanufacturing tool may use a sign algorithm to sign the digital signature over the remanufacturing data, for example, as provided by a distant server.

In one example, the logic circuit 1 is configured to lock certain bits, fields and/or partitions of the guide partition group 23 and the second and/or third use partition group 25 to a read only state in response to a host command. Such host command may be a write command to a RW2RO (or different) access mode, or a separate lock command. The CPU 7 may be configured to lock the partitions, or bits and/or fields within the partitions and prevent further (re-) writing. For example, the logic circuit 1 may lock bits after they are set from zero to 1. The locking capability for the additional partition groups 23, 25 could provide assigned third party remanufacturers with a similar level of security and/or control as original manufacturers.

Figure 2:
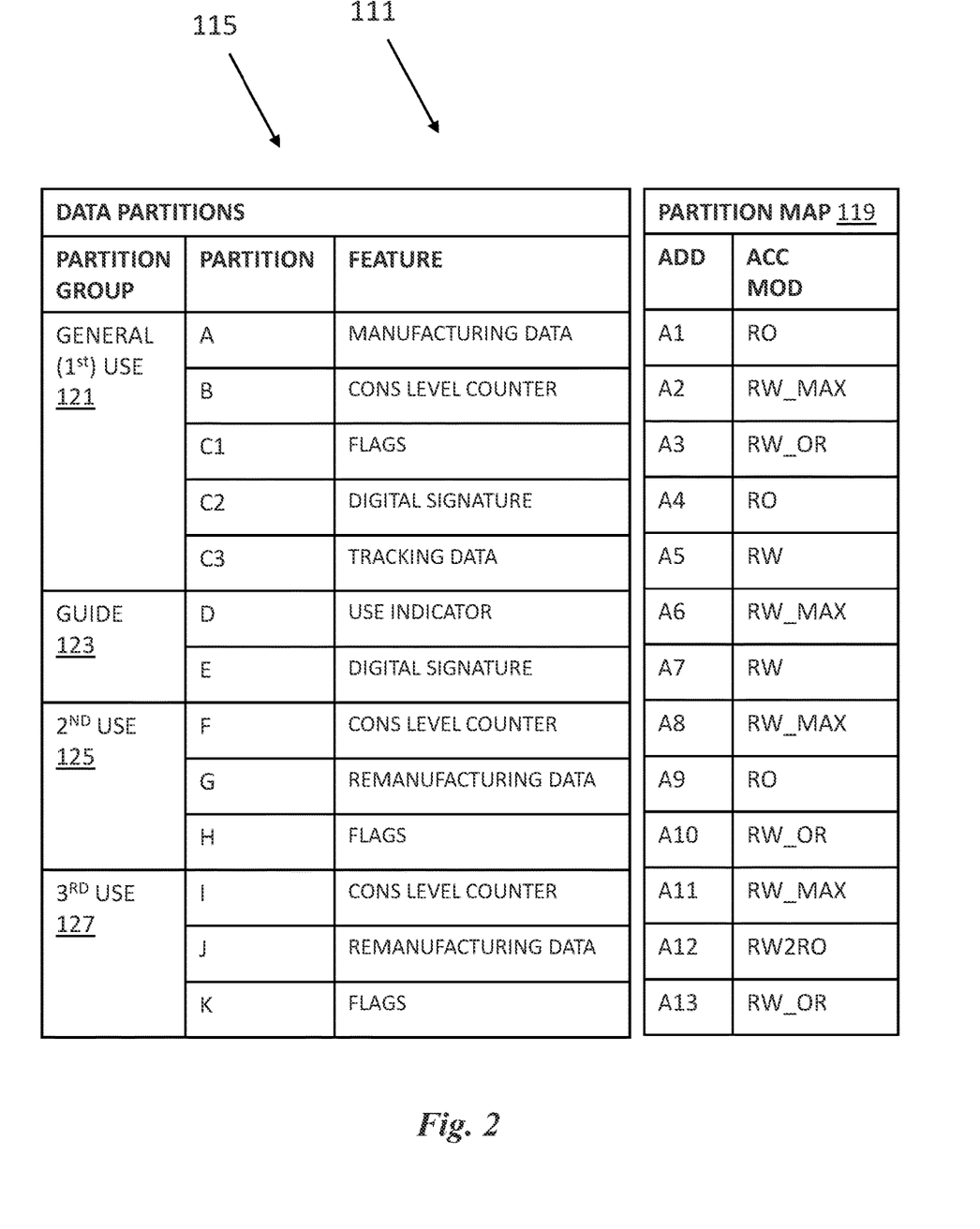
FIG. 2 illustrates a diagram of another example of a logic circuit.

FIG. 2 illustrates another example of a memory 111 of a logic circuit, illustrated in a table format. The example memory 111 includes a payload including a plurality of partitions A-K, distributed over different partition groups 121, 123, 125, 127, of which respective addresses and access modes may be set in the partition map 119. In FIG. 2, rows including partitions A-K and corresponding rows of partition map references (addresses A1-A13 and access modes) are aligned at the same row heights, for illustration purposes.

In the example, the general use partition group 121 comprises a read only (RO) manufacturing data partition A; a consumable level counter partition B of an increment-only access mode (RW_MAX); a flags partition C1 of bit-level read/write to read only, or bit-level increment-only (RW_OR) access mode; a digital signature partition C2 of a read-only (RO) access mode; and a tracking data partition C3 of a read/write (RW) access mode. In this example the flags partition C1 may include an at least one anti-theft function whereby at least one respective bit can be set and locked to lock the logic circuit to a printer and/or printer fleet. The flags partition may also include consumable exhaustion flags that indicate if a certain consumable volume threshold has been surpassed, for example such as more than 100% of an original consumable level or more than 150% of an original consumable level. A consumable exhaustion flag of higher than 100% could point to a refill without upgrading the logic circuit. The corresponding flag bit(s) are configured to be set and locked by the bit-level increment-only access mode (RW_OR). A set flag my refer to a zero value being set to one, which then become read-only. The logic circuit may be configured to lock the flag bits (or an entire partition or field) to a read-only state in response to a corresponding lock command. The RW tracking partition C3 may include updatable variables such as pages printed or any other use data. During remanufacturing when a guide partition group 123 and a second use partition group 125 are written, some of these consumable exhaustion flags in the general use partition group 121 may be set to indicate a refilled state. Flags of the same functions may be provided for the new uses in the respective flag partitions H, K of the second and/or further use partition groups 125, 127.

In the illustrated example, the guide partition group 123 includes a use indicator partition D of an increment only (RW_MAX) access mode and a second digital signature partition E of a read-write access mode. The use indicator is to increment only, whereby its value is incremented for each remanufacturing event, to point to the second or third use partition group 125, 127. The second digital signature is signed over the digital signature of the general use partition group 121 and manufacturing data of the second and/or third use partition group. A second digital signature of a second remanufacturing event may be written over a previous second digital signature of a first remanufacturing event, whereby such second digital signature may be based on the first digital signature of partition C2 and remanufacturing data (e.g., partition J) of the third use partition group 127. The second digital signature of the second remanufacturing event may also be based on the first remanufacturing data of the second use partition group 125.

In one example, the second digital signature may also be signed over the use indicator of the same partition group. With each remanufacturing event the use indicator may be incremented and the digital signature may be signed over the incremented use indicator. In a further example the digital signature may include the use indicator whereby the second digital signature partition may also be the use indicator partition.

Each of the second use partition group 125 and third use partition group 127 includes a consumable level counter partition F, I of increment-only access mode (RW_MAX) to increment as the consumable is dispensed in accordance with a dropping consumable level; a remanufacturing data partition G, J that depending on the state of the logic circuit is read-only or read/write to read only, i.e., read/write before writing the partition G or J and read only after writing the respective partition G or J; and a flags partition H, K of bit-level increment-only (RW_OR) access mode, or, if all flags would be set, read-only. The general use partition group 121 includes first flags to be set when the use indicator indicates to use the general use partition group, and the second use partition group includes second flags to be set when the use indicator indicates to use the second use partition group. For example, this allows the flags to be set at each manufacturing or remanufacturing event corresponding to a fill level and/or preference. The flags may indicate that a certain consumable consumption point has passed, such as a first exhaustion level, a second exhaustion level, etc. Other flags include anti-theft bits or host fleet bits that tie a consumable to a certain host or fleet of hosts, respectively, which may be set at first install of the respective use (i.e., a first user install after manufacture or remanufacture).

The second and/or further use partition group 125, 127 includes variables (values) overlapping with variables of the general use partition group 121, to replace these variables of the general use partition group, such as the already mentioned flags or (re)manufacturing data including fill level and scale factors. The second and/or further use partition group 125, 127 may also include other variables of other functions not present in the general use partition group, such as an indicator of the remanufacturer such as a second trademark. Other variables included in at least one further use partition group but not in the general use partition group may include at least one of a template version based on which new information can be added that was not known at the time of original manufacture; and/or, a use tag for example to tie a component to subscription program that was previously not part of such program; and/or, certain license bits. The general use partition group 121 may include variables not present in the second or third use partition group 125, 127 some of which may also be used by a host during the second or third use, when the use indicator points to the second or third use partition group 125, 127. In this paragraph, variables may include identifiers (IDs), parameter values or other values.

In one example the general use partition includes an ID value, whereby the digital signature in the general use partition is signed over that ID. Similarly, the at least one further use partition groups 125, 127, includes the same ID (e.g., in the remanufacturing data partition) and the second digital signature may be signed over that ID. For example, this signing over a repeated ID with respective signatures may provide for additional security. The ID may be repeated for each further use partition group or for only one second use partition group.

Certain variables may function to replace original data of the general use partition group and/or may be used as complementary data, whereby similar functions may be present in the general use partition group and the later use partitions groups. For example, a remanufacturing date may be added to the remanufacturing data, which remanufacturing date can be used to calculate a water vapor loss of the consumable in the reservoir. The remanufacturing date can replace an original manufacturing date or can be newly added. Similarly, prime information or prime flags can be added as replacement data or complementary data to the further use partition group. The remanufacturing data may include a field for a component model name (e.g., a print cartridge selectability number) to replace the original component model name.

As mentioned, variables added to the further use partition group(s) may include license bits. License bits may be set to assign certain use levels to particular remanufacturers (who, in turn, may be indicated by an ID code in the remanufacturer trademark field). The license bits may be provided in the remanufacturing partition G, J, whereby each corresponding bit or group of bits may be used to enable or disable a certain function such as a certain low consumable level indication and/or other function. The license bits could also be set as flags in the flag partition.

In one example, after first manufacture and before and during a first use, all partitions D-K of the guide partition group 123 and the further use partition groups 125-127 are set to zeros. Partitions F, I of the second and third consumable level counters may have the same length and access modes, whereby the length may be derived from the corresponding partition address. In one example, the data length of a partition may be derived from the corresponding address and the address of the subsequent address as indicated in the partition map, for example where such address only indicates a partition start address. The first consumable level counter partition B may have the same length and access mode as the second and third counter partitions F, I. Also the flag partitions H, K and remanufacturing data partitions G, J of the second and third use partition groups 125, 127 may have the same lengths and access modes, which length may be derived from the partition map addresses and which access modes may also be defined by the partition map 119. The data sizes and access modes of partitions having the same functions but in different use partition groups 125, 127 may be the same. A data length may correspond to data size. A data size (i.e. length) of the manufacturing data partition A of the general use partition 121 may be greater than the size of the remanufacturing partitions G, J of the further use partition groups 125, 127, for example to include certain initial data that does not need to be changed or used after remanufacture so it does not need to form part of the remanufacturing data.

In other examples, certain partitions F-K of at least one further use partition group 125, 127 may include preset values, whereby at remanufacture, only a switch needs to be set to refer to the correct partition group, such as the use indicator of partition D.

Figure 3:
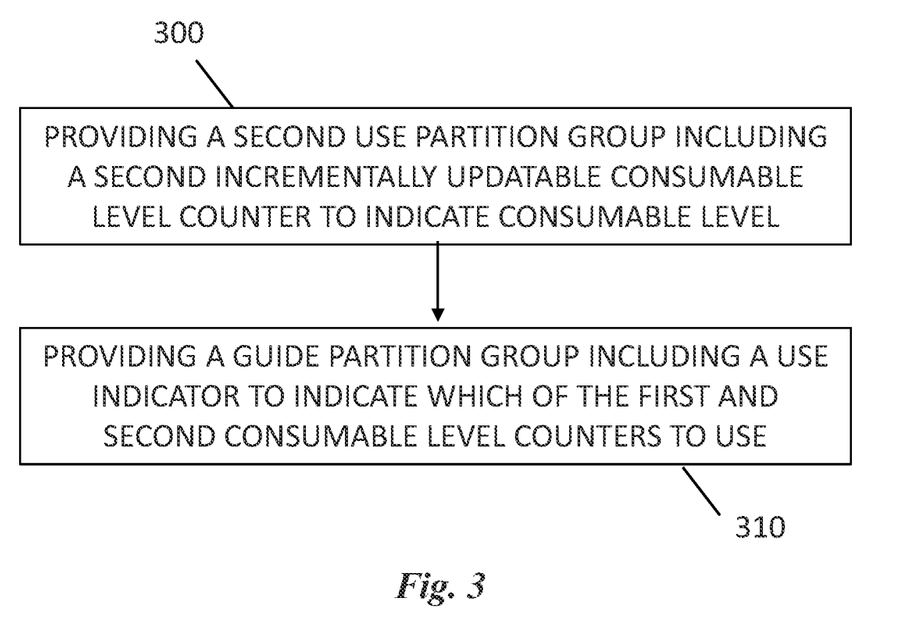
FIG. 3 illustrates a flow chart of an example method of adapting a logic circuit for multiple uses.

FIG. 3 illustrates a flow chart of an example method of adapting a logic circuit. The logic circuit may be adapted to support multiple uses, for multiple fill events each time after a period of usage. The method may provide for a dedicated consumable level gauge for each use. The logic circuit that is obtained with the example method of FIGS. 3 and 4 may be a logic circuit in accordance with any of the aforementioned examples. The example method of FIG. 3 may involve, in addition to the general use partition group, providing a second use partition group including a second incrementally updatable consumable level counter to indicate consumable level (block 300). The method may further involve, providing a guide partition group including a use indicator to indicate which of the first and second consumable level counters to use (block 310). Different access modes and addresses of the second use and guide partitions may be set in the partition map. The consumable level counters of both the general use partition group and the second use partition groups may be set to zero.

Figure 4:
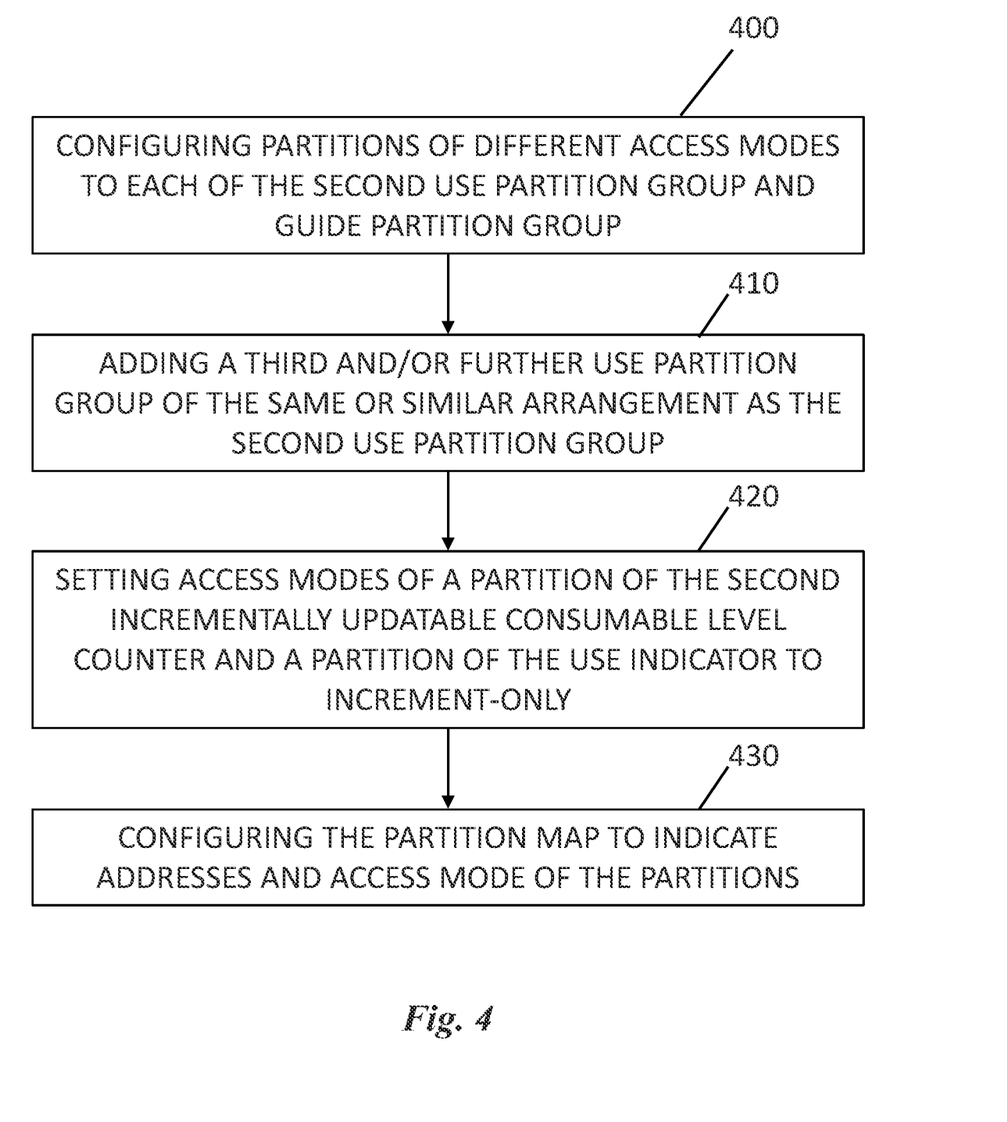
FIG. 4 illustrates a flow chart of another example method of adapting a logic circuit for multiple uses.

FIG. 4 illustrates a flow chart of further example steps of a method of adapting a logic circuit to obtain a logic circuit of the examples described in this disclosure. The example method of FIG. 4 may be combined with the example method of FIG. 3. The method steps of FIGS. 3 and 4 can be executed in any order or sometimes concurrently. The method may include configuring partitions to have different access modes for each of the second use partition group and guide partition group (block 400). In one example the access mode may be defined in the partition map, and/or the logic circuit may be configured to lock certain read-write to read-only (RW2RO) partitions after a write event.

The method may include adding a third and/or further use partition group of the same or similar arrangement as the second use partition group (block 410), to the partition map and payload. Each "$n^{th}$" use partition group may be associated with a particular $2^{nd}$ or later use after a respective refill event. Each $n^{th}$ use partition group includes a corresponding consumable level counter to indicate the consumable level for each use, plus corresponding remanufacturing data. The use indicator in the guide partition group may point to the particular $n^{th}$ use partition group.

A single partition may include several remanufacturing data of different remanufacturing events, for example without a need to overwrite. For example, the same parameter field may be repeated multiple times in a single partition, each field to be written for a different remanufacturing event. A single partition in the single second (and further) use partition group may be updated multiple times for multiple remanufacturing events. Hence, in one example, a second use partition group may be associated with multiple remanufacturing events.

The method may include setting access modes of (i) a partition F of the second incrementally updatable consumable level counter and/or (ii) a partition D of the use indicator to increment-only (block 420). The method may further include configuring the partition map to indicate addresses and access mode of the partitions (block 430).

Figure 5:
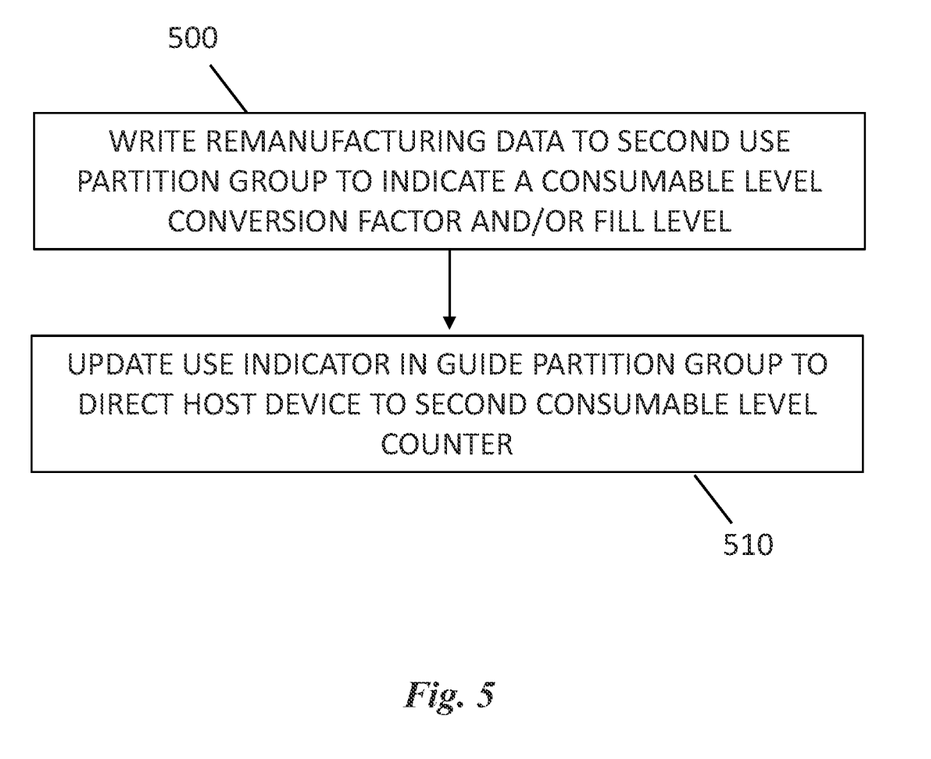
FIG. 5 illustrates a flow chart of an example method of adapting a logic circuit.

FIG. 5 illustrates a flow chart of an example method of adapting a logic circuit, such as a logic circuit of any of the aforementioned examples, for example during remanufacture. In one example, the method of FIGS. 3 and/or 4 may take place during manufacture and the method of FIGS. 5 and/or 6 may take place during remanufacture, that is, FIGS. 3/4 and FIGS. 5/6 may be associated with distinct write events, although in other examples all these FIGS. 3-6 may be associated with a single logic write event.

The example method of FIG. 5 involves, in the second use partition group 25, 125, writing remanufacturing data, to indicate a consumable level scale factor and/or fill level (block 500). The method further involves, in the guide partition group 23, 123, updating a use indicator (partition D, FIGS. 1 and 2) to, when read by a compatible host device, direct the host device to the second consumable level counter (block 510). Such writing may take place in any order, for example, first block 500, then block 510, or first block 510, then block 500. The writing of the guide and second use partition groups 123, 125, may take place when a first life cycle has already been substantially completed, at a consumable supply component remanufacturing event, for example, when the consumable reservoir has substantially emptied, or when a consumable level exhaustion is indicated by the first consumable level counter and/or a flag in the general use partition group, e.g., as updated by the host based on printed pages or drops or other parameters.

Figure 6:
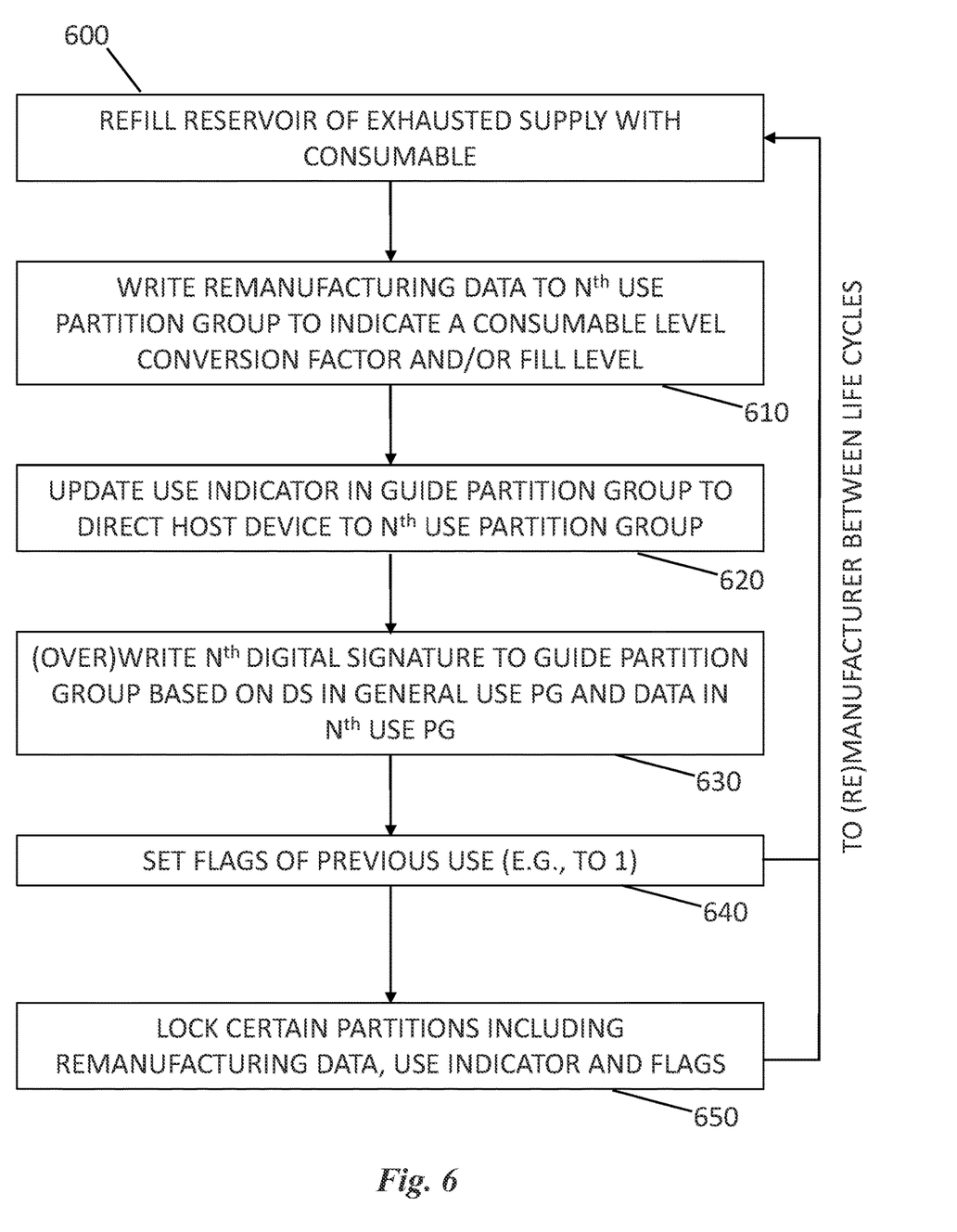
FIG. 6 illustrates a flow chart of an example method of remanufacture including refilling a consumable supply component and adapting a logic circuit.

FIG. 6 illustrates a flow chart of an example method of remanufacture including refilling a consumable supply component and adapting a logic circuit, such as any of the aforementioned example logic circuits. Again, the method steps may be executed in any order, not necessarily in the same order as FIG. 6. The method includes filling or refilling a reservoir with a consumable such as ink, print agent, toner, or any dispensable fluid or particulate substance (block 600). The method may include, in the second, third, or further ($n^{th}$) use partition group, writing remanufacturing data to indicate a consumable level scale factor and/or fill level (block 610). The hence written fill level and scale factor at least approximately correspond to the actual fill level so that the actual fill level can be calculated based on the value of the consumable level counter.

The method may further include updating the use indicator to, when read by a compatible host device, direct the host device to the $n^{th}$ consumable level counter (block 620). Updating the use indicator may comprise incrementing its value, for example with 1, corresponding to incrementing a number of uses (used life cycles) of the associated consumable supply component. The method may include writing or overwriting a second digital signature to a digital signature partition E of the guide partition group based on the digital signature in the general use partition group and data of the $n^{th}$ use partition group (block 630). The data may include said remanufacturing data. The second digital signature may each time be overwritten for each use after the second use when updating a respective subsequent use partition group.

The method may further include the setting of certain flags of a previous use (block 640). For example, when configuring the second use partition group, certain flags of partition C1 of the general use partition group may be set to 1, to the extent these flags were not already set to 1 during initial use, whereas new flags may be created as zero-values in the second use partition group. The flags partition C1 may be of a bit-level increment-only access mode. The setting of a flag may involve setting a zero to 1, whereby such value may subsequently be locked by the logic circuit. As explained previously, examples of flags include an anti-theft bit, for tying a component to a single host; a host fleet bit, for tying a component to a fleet of hosts; and at least one consumable exhaustion flag that indicates if a certain consumable volume threshold has been surpassed, for example a threshold of 100% of an indicated fill level or 150% of an indicated fill level (e.g., of the remanufacturing data). Some flags can be set by the user at install or during use whereas other flags may be automatically set by the host during use of the consumable supply component while the consumable material is dispensed.

The method may further include locking certain partitions (block 650) including the partitions G, H, J and K of the respective remanufacturing data and/or flags. The logic circuit may use its capability to lock certain partitions and/or (e.g., bit level) fields to read-only. For example certain increment-only partitions and/or fields may be set to 1. The method may include locking the previous (e.g., first or second) consumable level counter by setting it to all 1s. The method may include locking a flag partition of a previous use (e.g., general use or second use) partition group by setting all flags to 1s. The method may include locking the previous manufacturing data or remanufacturing data to read-only.

The logic circuit can be adapted according to principles described in this disclosure for any number of life cycles.

While in this disclosure a second use is addressed, and a second use partition group, such second use and second use partition group may be read as any subsequent use and any further use partition group.

In yet another example, certain steps of the methods of FIGS. 5 and/or 6 may be executed during original manufacturing, such as step 500 and 610, so that certain re-use partitions are written and/or set in advance of a first new use.

In certain examples, the number of re-uses of the consumable level counter may be limited depending on a data space available in the logic circuit memory, for example, bearing in mind that more data space increases costs of the logic circuit. For example, the number of refills "n" may be two, so that a consumable supply component may cover three life cycles including a first fill and two refills, while being supported by the same logic circuit throughout these three life cycles. In such example, the logic circuit can be provided with only a second and third use partition group. In another instance the logic circuit may be provided with only a second use partition group, or with more than two extra use partition groups. The logic circuit may provide for corresponding different consumable level counters and (re)manufacturing data, facilitating fill level flexibility. A security advantage of configuring the logic circuit to have at least one further use group is that cryptographic authentication and digital signature security may be used for each life cycle. In one example, a(n original) serial number or product identifier or other identifier stored in the general use partition group may be used throughout various life cycles, and actively authenticated by a network server. The identifier can be associated with a third party, who may be represented in a trademark field of the remanufacturing data. In certain instances, a server may act as a host. In other examples, a host may act as a remanufacturing tool to update the guide partition group and further use partition groups corresponding to the remanufacturing event.

In certain examples, partitions that are of a read/write to read once (RW2RO) access mode, may instead be of a write once access mode. In certain examples the logic circuit may be configured to lock partitions of the write once access mode after writing without needing a separate locking command. In certain examples the logic circuit may be configured to lock partitions, for example of a read/write to read-only access mode, to read-only after a separate locking command separate from the write command. Other usage remanufacturing data and flags stored on the logic circuit may include wear information, page count, prime events, etc.

In one example, where previous third parties provided for logic circuits with resetting functionalities to facilitate re-use, the logic circuit of this disclosure provides for an alternative approach. While this disclosure describes use of features related to remanufacturing by third parties, this disclosure and the claims may cover any logic circuit or method using the claimed and described features, conceived by any party, regardless of whether the logic circuit has gone through different previous life cycles or not, and irrespective of whether the logic circuit has been newly manufactured or remanufactured. The features described in this disclosure may provide for a logic circuit that is compatible with a host device that is pre-configured to read, write and/or authenticate the logic circuit of this disclosure.

In this disclosure a single use or life or lifecycle may refer to usage between a fill event and a substantial exhaustion; and/or between a manufacturing and a remanufacturing event; and/or between remanufacturing events. The fill event may completely or partially fill the consumable reservoir. In certain examples, an overfill may be assigned to the remanufacturing data, that is, a fill proportion that leads to a consumable level calculation based on the counter that is more than the original reservoir volume of the component. Just before the fill event the reservoir may be empty but need not be completely empty. Whether a reservoir is substantially empty or not before a new fill can be a matter of choice and/or can depend on error and/or safety margin required. In this paragraph, a fill event encompasses a fill and/or refill.

Throughout this disclosure the logic circuit data arrangement of the logic circuit is described in at least two different states. A first state is the logic circuit right between a first brand new manufacture and write event and until its first install by the first user. In the first state, the general use partition group is ready for reading and writing. A second state may be right after a first or later remanufacturing event, whereby the use indicator may have a value pointing to the further use (e.g., second, third or later use) partition group, and the respective further use partition group may include the remanufacturing data for interpreting the second (or third or further) consumable level counter. The partition map may remain static between the first and second state. The general use partition group alters during use in the first state. The second or further use partition group alters during use in the second state while the general use partition group may remain static in that second state.

In certain examples, the general use partition group may include a product identifier or product serial number or the like, which may be read by a host at each use, that is, also when the use indicator guides towards a further use partition group. Such identifier or number may be part of the manufacturing data. Such identifier or number does not need to form part of any of the further use partition groups. Also other data in the general use partition group may be read during subsequent uses when the use indicator guides towards a further use partition group.

In one example, it is not necessary to replace the logic circuit on a consumable supply component for re-writing because the logic circuit may be pre-adapted to be reconfigured to support remanufacture. The logic circuit may be reconfigured for a subsequent use while remaining attached to the same component. For example a relatively simple tool may be used to reconfigure the logic circuit through the pre-disposed printer communications interface 9, such as the I2C contact pad(s).

Throughout this disclosure, the increment-only access modes may be any monotonic access mode to either increment only or decrement only. For example the use indicators and/or consumable level counters may be either to increment only or to decrement only.

In certain examples, the partitions of a second and/or further use partition group can be prepopulated at original manufacture, for example at the same time as the general use partition group, so that for a second use of the component the host may switch to the populated second/further use partition group. In certain examples, rather than having pre-fixed access modes, certain access modes may be altered during remanufacturing, for example by a secure sever using a secure key.

In aspect of this disclosure, a host system may be provided. The host system may be any of the hosts mentioned in this disclosure, comprising a controller to communicate with the example logic circuits of this disclosure over the interface of the logic circuit. The interface may comprises an I2C interface. In one example the host system may be at least temporarily, for example via a distant secure server, provided with an admin key to adapt the logic circuit. The system may execute any of the method steps disclosed in FIGS. 5 and 6. The controller may comprise a CPU and firmware. In one example the controller further comprises a secure microcontroller or similar type, to communicate with the counterpart secure microcontroller of the logic circuit. In a further example the system may be configured to receive the consumable supply component described in several examples of this disclosure. The system may comprise at least part of a printer, whereby the printer controller may be configured to adapt the logic circuit in accordance with the several method steps described in this disclosure. The controller may be configured to read or write and provide lock commands.

Effects associated with certain example logic circuits of this disclosure may include at least one of the following effects, or other effects. The logic circuit may be updated by the original OEM or qualified or licensed third party refillers that are not the original manufacturer of the component and/or logic circuit. In certain examples, the logic circuit may be relatively securely updated for re-use while written data may be re-writable and without using specific partition access modes. The multiple re-use functionality may be provided to all newly manufactured logic circuits and consumable supply components without exposing a security risk and/or without increasing data space and costs too much. Consumable level data (e.g., comprised of consumable level counters) may be enabled for refilled components, not just for first usage. Previous/current usage data may be included (e.g., and locked) over each lifetime, which data may be used for warranty purposes.

In one aspect, this disclosure comprises a logic circuit to attach to a consumable supply component exchangeable with respect to a host. The logic circuit may include a memory storing a plurality of partition groups. Each partition group may include (i) a plurality of partitions, each partition having a predetermined access mode, and/or (ii) metadata including a partition map defining an address and access mode for each of said partitions, defining different access modes for at least some of the partitions. The plurality of partition groups comprises (i) a general use partition group including a first consumable level counter incrementally updatable to indicate consumable level, and manufacturing data including a fill level and a consumable level scale factor to calculate the consumable level based on the first consumable level counter; and/or (ii) a second use partition group including a second incrementally updatable consumable level counter to indicate consumable level; and/or (iii) a guide partition group including a use indicator to indicate which of the first and second consumable level counters to use. The consumable level counters can be comprised of partitions having a monotonic access mode, such as an increment only or decrement only access mode. A partition of the use indicator can be of a monotonic access mode, such as an access mode to increment or decrement only; or the use indicator can be included in a digital signature partition, for example when writing the digital signature to the guide partition group at remanufacturing. In such example, the guide partition group may comprise a read/write partition to write a second digital signature including the use indicator. A partition comprising the manufacturing data may be read-only, and the second use partition group may include a read/write to read-only partition, or a write once partition, to write read-only remanufacturing data. The use indicator may be indicative of the at least one partition group that a host should read and/or update. Each partition group may include a plurality of distinct partitions of distinct access modes. The plurality of partitions may further include a third use partition group that may be a repetition of the second use partition group, whereby the use indicator is configured to indicate to a connected host which of the general use, second use and third use group to use. Further use partition groups may be added for further remanufacturing events and the use indicator may be guide the host to each of the further use partition groups depending on the number of previous life cycles. In an example, the consumable level counter partitions of the second and third use partition groups have the same length and access modes, as defined by the partition map, and/or remanufacturing partitions of the second and third use partition groups have the same length and access modes, as defined by the partition map, and/or the consumable level counter partitions and remanufacturing data partitions have different access modes. The general partition group may include at least one partition that may be read only that includes a digital signature, and the guide partition group includes at least one separate partition having an access mode that may be read/write, to write and over-write digital signatures for each remanufacturing event corresponding to each corresponding use partition group. The logic circuit may be configured to lock certain bits, fields and/or partitions of the guide partition group and the second and/or third use partition group to a read only state in response to a corresponding write and/or lock request. In a further example, depending on the access mode (e.g., read/write to read only vs. write once) a respective bit, bit-field or partition is locked by the logic circuit after writing without a separate lock command or a separate lock command is needed to lock the respective bit, field or partition after writing. The memory may further stores a base key and the CPU (Central Processor Unit) can be configured to cryptographically authenticate data for transmission using the base key and/or a key derived from a master key. In a further aspect, a method of configuring an example logic circuit of this disclosure is provided. The method may comprise providing a second use partition group including a second incrementally updatable consumable level counter to indicate consumable level; and providing a guide partition group including a use indicator to indicate which of the first and second consumable level counters to use. The method may further comprise setting access modes of the partitions of the second incrementally updatable consumable level counter and the use indicator to increment-only. The method may further comprise configuring partitions to have different access modes for each of the second use partition group and guide partition group; and/or adding at least one further use partition group of the same or similar arrangement as the second use partition group; and/or configuring the partition map to indicate addresses and access modes of the partitions. In yet another aspect, a method of adapting an example logic circuit of this disclosure is provided. The method may comprise, in the second use partition group, writing remanufacturing data to indicate a second fill level and/or second scale factor; and/or, in the guide partition group, updating the use indicator to, when read by a compatible host device, direct the host device to the second consumable level counter and/or second use partition group. In one example, a digital signature including the use indicator may be generated and written to the guide partition group. In one example, the logic circuit has gone through at least one previous use cycle including a fill event and consuming the consumable. The method may further comprise writing a second digital signature to a digital signature partition of the guide partition group based on the digital signature in the general use partition group and data of the second use partition group. The method may further comprise overwriting a previous second digital signature with a new digital signature before again a new life cycle. The method further comprises at least one of locking the first consumable level counter by setting it to all 1s, and/or, locking a flag partition of the general use partition group by setting all flags to 1s, and/or, locking the remanufacturing data to read-only by writing the remanufacturing data. The method may further comprise in the guide partition group, updating the use indicator to, when read by a compatible host device, direct the host device to the third consumable level counter, and in the third use partition group, writing third manufacturing data to indicate a consumable level scale factor and/or fill level. The method may further comprise remanufacturing a replaceable component including a reservoir for consumable material, by filling the reservoir with the consumable material; and executing said method, for example, while the logic circuit is attached to the component. In again another aspect, a system is provided to update a logic circuit of any of the examples of this disclosure using a method of any of the examples of this disclosure. The system may comprise a host device controller to receive a consumable supply component.

This disclosure also encompasses logic circuits where the further use partition group(s) is/are pre-updated, for example at original manufacturing and/or remanufacturing. For example, the guide use partition group includes a second digital signature that is signed over a digital signature in the general use partition group and data of the second use partition group. In an example, the digital signature includes the use indicator. The general use partition group may include first flags to be set when the use indicator indicates to use the general use partition group, and the second use partition group may include second flags to be set when the use indicator indicates to use the second use partition group. The flag partitions of those second flags may be of a read/write to read only access mode. The further use partition group(s) may include certain variables that overlap with variables of the general use partition group, to replace these variables of the general use partition group, and other variables of other functions not present in the general use partition group. Further partitions and values may be updated during manufacturing and/or remanufacturing in the guide partition group and the at least one further use partition group, as described in this disclosure.

The invention claimed is:

1. A logic circuit to attach to a consumable supply component exchangeable with respect to a host, the logic circuit including:
 a memory storing
  a plurality of partition groups, each partition group including a plurality of partitions, each partition having a predetermined access mode,
  metadata including a partition map defining an address and access mode for each of said partitions, defining different access modes for at least some of the partitions;
 a data interface to transmit data with respect to the host; and
 a CPU (Central Processor Unit) to execute instructions in response to commands from the host;
 wherein the plurality of partition groups comprises
 a general use partition group including
  a first consumable level counter incrementally updatable to indicate consumable level, and
  manufacturing data including a fill level and a consumable level scale factor to calculate the consumable level based on the first consumable level counter;
 a second use partition group including a second incrementally updatable consumable level counter to indicate consumable level; and
 a guide partition group including a use indicator to indicate which of the first and second consumable level counters to use.

2. The logic circuit of claim 1 wherein the consumable level counters are comprised of partitions having a monotonic access mode.

3. The logic circuit of claim 1 wherein the use indicator is of an access mode to increment only.

4. The logic circuit of claim 1 wherein the guide partition group comprises a read/write partition to write a second digital signature including the use indicator.

5. The logic circuit of claim 1 wherein
 a partition comprising the manufacturing data is read-only, and
 the second use partition group includes a read/write to read-only partition, or a write once partition, to write read-only remanufacturing data.

6. The logic circuit of claim 1 wherein the use indicator is indicative of the at least one partition group that a host should read and/or update.

7. The logic circuit of claim 1 where each partition group includes a plurality of distinct partitions of distinct access modes.

8. The logic circuit of claim 1 further including a third use partition group that is a repetition of the second use partition group, the use indicator to indicate to a connected host which of the general use, second use and third use group to use.

9. The logic circuit of claim 8 whereby
 consumable level counter partitions of the second and third use partition groups have the same length and access modes, as defined by the partition map, and
 remanufacturing partitions of the second and third use partition groups have the same length and access modes, as defined by the partition map, and
 the consumable level counter partitions and remanufacturing data partitions have different access modes.

10. The logic circuit of claim 1 wherein the general use partition group includes at least one partition that is read only that includes a digital signature, and
 the guide partition group includes at least one separate partition having an access mode that is read/write, to write and over-write digital signatures for each remanufacturing event corresponding to each corresponding use partition group.

11. The logic circuit of claim 1 configured to lock certain bits and/or partitions of the guide partition group and the second and/or third use partition group to a read only state in response to a corresponding write and/or lock request.

12. The logic circuit of claim 1 wherein the memory further stores a base key and the CPU (Central Processor Unit) is configured to cryptographically authenticate data for transmission using the base key.

13. The logic circuit of claim 1, further comprising a consumable supply component comprising a reservoir for consumable material and a logic circuit.

14. A method of configuring a logic circuit attachable to a consumable supply component for reuse, the logic circuit comprising:
 a memory storing
  a plurality of partition groups, each partition group including a plurality of partitions, each partition having a predetermined access mode, metadata including a partition map defining an address and access mode for each of said partitions, defining different access modes between at least some of the partitions;

a data interface to transmit data with respect to the host; and a CPU (Central Processor Unit);

wherein the plurality of partition groups comprises a general use partition group including a first consumable level counter incrementally updatable to indicate consumable level, a fill level and scale factor to calculate the consumable level using the first consumable level counter;

wherein the method comprises providing a second use partition group including a second incrementally updatable consumable level counter to indicate consumable level; and providing a guide partition group including a use indicator to indicate which of the first and second consumable level counters to use.

15. The method of claim 14 comprising setting access modes of the partitions of the second incrementally updatable consumable level counter and the use indicator to increment- only.

16. The method of claim 14 further comprising configuring partitions to have different access modes for each of the second use partition group and guide partition group;

adding at least one further use partition group of the same or similar arrangement as the second use partition group; and configuring the partition map to indicate addresses and access modes of the partitions.

17. A method of adapting a logic circuit, the logic circuit comprising:

a memory storing a plurality of partition groups, each partition group including a plurality of partitions, each partition having a predetermined access mode, metadata including a partition map defining an address and access mode for each of said partitions, defining different access modes for at least some of the partitions;

a data interface to transmit data with respect to the host; and a CPU (Central Processor Unit) to authenticate the data for transmission; wherein the plurality of partition groups comprises a general use partition group including a first consumable level counter updatable to indicate consumable level, manufacturing data including a fill level and scale factor to calculate the consumable level based on the first consumable level counter;

a second use partition group including a second updatable consumable level counter to indicate consumable level; and a guide partition group including a use indicator to indicate which of the first and second consumable level counters to use;

the method comprising in the second use partition group, writing remanufacturing data to indicate a second fill level and/or second scale factor;

in the guide partition group, updating the use indicator to, when read by a compatible host device, direct the host device to the second consumable level counter and/or second use partition group.

18. The method of claim 17 wherein the logic circuit has gone through at least one previous use cycle including a fill event and consuming the consumable.

19. The method of claim 17 further comprising writing a second digital signature to a digital signature partition of the guide partition group based on the digital signature in the general use partition group and data of the second use partition group.

20. The method of claim 19 further comprising overwriting a previous second digital signature with a new digital signature.

21. The method of claim 17 wherein the method further comprises at least one of locking the first consumable level counter by setting it to all 1s, locking a flag partition of the general use partition group by setting all flags to 1s, and/or locking the remanufacturing data to read-only by writing the remanufacturing data.

22. The method of claim 17 wherein the memory includes a third use partition group including a third consumable level counter, the method further comprising, in the guide partition group, updating the use indicator to, when read by a compatible host device, direct the host device to the third consumable level counter;

in the third use partition group, writing third manufacturing data to indicate a consumable level scale factor and/or fill level.

23. The method of claim 17, further comprising remanufacturing a replaceable component including a reservoir for consumable material by filling the reservoir with the consumable material;

wherein the logic circuit is attached to the component.

24. The method of claim 17, further comprising updating a logic circuit.

25. The method of claim 24, further comprising:

receiving a supply component comprising a reservoir for consumable material and a logic circuit; and communicating with the logic circuit over the interface of the logic circuit.

26. A logic circuit comprising: data and functions for an exchangeable print supply component carrying a to-be-dispensed consumable material, configured to interface with a host printer controller, adapted to be upgraded for each new life cycle and fill of the print supply component, and including a memory storing a plurality of partition groups for a plurality of life cycles of the print supply component, each partition group including a plurality of partitions, each partition having a predetermined access mode;

metadata including a partition map defining an address and access mode for each of said partitions, defining different access modes for at least some of the partitions; and a data interface to transmit data with respect to the host printer controller;

wherein the plurality of partition groups comprises a general use partition group including a first consumable level counter updatable to indicate consumable level, a fill level and scale factor to calculate the consumable level based on the first consumable level counter;

at least one further use partition groups, including an updatable consumable level counter comprised of an incrementally updatable counter partition to indicate a consumable level of a corresponding further use of the print supply component; and a guide partition group to indicate which of the first or further consumable level counters to use.

\* \* \* \* \*